United States Patent
Lyu et al.

(10) Patent No.: US 12,328,617 B2
(45) Date of Patent: Jun. 10, 2025

(54) METHOD AND APPARATUS FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/823,492

(22) Filed: Sep. 3, 2024

(65) Prior Publication Data

US 2024/0422609 A1    Dec. 19, 2024

Related U.S. Application Data

(63) Continuation of application No. PCT/CN2023/082071, filed on Mar. 17, 2023.

(30) Foreign Application Priority Data

Feb. 1, 2023   (CN) .......................... 202310097773.5

(51) Int. Cl.
*H04W 4/00*       (2018.01)
*H04W 24/10*     (2009.01)
(Continued)

(52) U.S. Cl.
CPC ........... *H04W 24/10* (2013.01); *H04W 36/26* (2013.01); *H04W 84/06* (2013.01)

(58) Field of Classification Search
CPC ..... H04W 24/10; H04W 36/26; H04W 84/06; H04W 4/029; H04W 48/18
(Continued)

(56) References Cited

U.S. PATENT DOCUMENTS

| | | | |
|---|---|---|---|
| 10,326,766 B2 * | 6/2019 | Egner | H04W 12/08 |
| 11,683,088 B2 * | 6/2023 | Edge | H04W 48/12 |
| | | | 455/422.1 |

(Continued)

FOREIGN PATENT DOCUMENTS

| | | |
|---|---|---|
| CN | 111526484 | 8/2020 |
| CN | 113644950 | 11/2021 |

(Continued)

OTHER PUBLICATIONS

International Search Report and Written Opinion in International Appln. No. PCT/CN2023/082071, mailed on Oct. 7, 2021, 9 pages (with English translation).

(Continued)

*Primary Examiner* — Marceau Milord
(74) *Attorney, Agent, or Firm* — Fish & Richardson P.C.

(57) ABSTRACT

A method and an apparatus for wireless communication are provided. An example method includes: performing, by a terminal device, neighboring cell measurement in a non-terrestrial network (NTN) cell based on a first parameter, wherein the first parameter is associated with one or more of following information: a distance between the terminal device and a network device in the NTN cell; a height of a network device in the NTN cell from ground; an azimuth angle of an antenna of a network device in the NTN cell; a sub-zone in the NTN cell, or a distance between an edge of the NTN cell and the network device.

20 Claims, 5 Drawing Sheets

(51) Int. Cl.
*H04W 36/26* (2009.01)
*H04W 84/06* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 11,696,106 | B2* | 7/2023 | Edge | H04W 88/16 |
| | | | | 455/404.1 |
| 11,811,488 | B2* | 11/2023 | Edge | H04W 4/90 |
| 11,812,371 | B2* | 11/2023 | Zorgui | G01S 13/42 |
| 11,828,831 | B2* | 11/2023 | Nam | G01S 13/723 |
| 2015/0087301 | A1* | 3/2015 | Choudhary | H04W 48/16 |
| | | | | 455/434 |
| 2017/0180092 | A1* | 6/2017 | Liu | H04L 5/005 |
| 2019/0058767 | A1* | 2/2019 | Chandramouli | H04L 12/14 |
| 2019/0380028 | A1* | 12/2019 | Rasanen | H04W 12/02 |
| 2021/0143897 | A1* | 5/2021 | Edge | H04W 4/029 |
| 2021/0144539 | A1* | 5/2021 | Edge | H04B 7/18526 |
| 2021/0144669 | A1* | 5/2021 | Edge | H04W 12/037 |
| 2022/0061004 | A1 | 2/2022 | Wigard et al. | |
| 2022/0131723 | A1* | 4/2022 | Bayesteh | H04B 7/0897 |
| 2022/0217561 | A1* | 7/2022 | Geng | H04W 64/003 |
| 2022/0236394 | A1* | 7/2022 | Nam | G01S 13/46 |
| 2022/0400462 | A1* | 12/2022 | Dai | H04B 7/04013 |
| 2023/0051569 | A1* | 2/2023 | Jiang | H04W 60/04 |
| 2023/0096165 | A1* | 3/2023 | Wu | H04W 16/24 |
| | | | | 455/100 |
| 2023/0102334 | A1* | 3/2023 | Roy | H04W 36/06 |
| | | | | 370/316 |
| 2023/0209426 | A1* | 6/2023 | Fu | H04W 36/08 |
| | | | | 370/331 |
| 2024/0048984 | A1* | 2/2024 | Ru | H04W 12/08 |
| 2024/0172077 | A1* | 5/2024 | Li | H04W 48/20 |

FOREIGN PATENT DOCUMENTS

| | | |
|---|---|---|
| CN | 114339999 | 4/2022 |
| CN | 114424590 | 4/2022 |
| CN | 115004722 | 9/2022 |
| CN | 115088302 | 9/2022 |
| CN | 115486128 | 12/2022 |
| CN | 115604812 | 1/2023 |
| WO | WO 2022077282 | 4/2022 |

OTHER PUBLICATIONS

Notice of Allowances in Chinese Appln. No. 202310097773.5, mailed on Jan. 12, 2024, 6 pages (with English translation).
Office Action in Chinese Appln. No. 202310097773.5, mailed on Aug. 17, 2023, 15 pages (with English translation).
Thales, "Summary of [Post116-e][101][NTN] Stage 2 running CR (Thales)," 3GPP TSG-RAN WG2 Meeting #116 electronic, R2-2111367, Online, Nov. 1-12, 2021, 11 pages.

* cited by examiner

METHOD AND APPARATUS FOR WIRELESS COMMUNICATION

CROSS-REFERENCE TO RELATED APPLICATIONS

This application is a continuation of International Application No. PCT/CN2023/082071, filed on Mar. 17, 2023, which claims priority to Chinese Patent Application No. 202310097773.5, filed with the China National Intellectual Property Administration on Feb. 1, 2023, and entitled "METHOD AND APPARATUS FOR WIRELESS COMMUNICATION", both of which are incorporated herein by reference in their entireties.

TECHNICAL FIELD

The present application relates to the field of communications technologies, and more specifically, to a method and an apparatus for wireless communication.

BACKGROUND

A non-terrestrial network (non-terrestrial network, NTN) system has relatively strong mobility. For a system in which a coverage region of an NTN cell is fixed relative to the ground (for example, a quasi-Earth fixed system), a terminal device may perform neighboring cell measurement based on a reference position of a serving cell provided by a network device.

Practically, in a system in which an NTN cell moves with a network device (for example, a quasi-Earth moving cell), a change of a coverage region of a serving cell may be detrimental to neighboring cell measurement to be performed by a terminal device.

SUMMARY

The present application provides a method and an apparatus for wireless communication. The following describes various aspects of embodiments of the present application.

According to a first aspect, a method for wireless communication is provided, including: performing, by a terminal device, neighboring cell measurement in an NTN cell based on a first parameter, where the first parameter is associated with one or more of the following information: a distance between the terminal device and a network device in the NTN cell; a height of a network device in the NTN cell from the ground; an azimuth angle of an antenna of a network device in the NTN cell; or a sub-zone in the NTN cell.

According to a second aspect, a method for wireless communication is provided, including: sending, by a network device, a first parameter to a terminal device, where the first parameter is used by the terminal device to perform neighboring cell measurement in an NTN cell, and the first parameter is associated with one or more of the following information: a distance between the terminal device and the network device; a height of the network device from the ground; an azimuth angle of an antenna of the network device; or a sub-zone in the NTN cell.

According to a third aspect, an apparatus for wireless communication is provided. The apparatus is a terminal device. The terminal device includes: a measurement unit, performing neighboring cell measurement in an NTN cell based on a first parameter, where the first parameter is associated with one or more of the following information: a distance between the terminal device and a network device; a height of a network device from the ground; an azimuth angle of an antenna of a network device; or a sub-zone in the NTN cell.

According to a fourth aspect, an apparatus for wireless communication is provided. The apparatus is a network device. The network device includes: a sending unit, sending a first parameter to a terminal device, where the first parameter is used by the terminal device to perform neighboring cell measurement in an NTN cell, and the first parameter is associated with one or more of the following information: a distance between the terminal device and the network device; a height of the network device from the ground; an azimuth angle of an antenna of the network device; or a sub-zone in the NTN cell.

According to a fifth aspect, a communications apparatus is provided, including a memory and a processor, where the memory is configured to store a program, and the processor is configured to invoke the program in the memory to perform the method according to the first aspect or the second aspect.

According to a sixth aspect, an apparatus is provided, including a processor configured to invoke a program from a memory to perform the method according to the first aspect or the second aspect.

According to a seventh aspect, a chip is provided, including a processor configured to invoke a program from a memory to cause a device installed with the chip to perform the method according to the first aspect or the second aspect.

According to an eighth aspect, a computer-readable storage medium is provided. The computer-readable storage medium stores a program that causes a computer to perform the method according to the first aspect or the second aspect.

According to a ninth aspect, a computer program product is provided, including a program that causes a computer to perform the method according to the first aspect or the second aspect.

According to a tenth aspect, a computer program is provided, where the computer program causes a computer to perform the method according to the first aspect or the second aspect.

In embodiments of the present application, a terminal device may perform neighboring cell measurement in an NTN cell based on a first parameter and association information. Based on information about a sub-zone in which the terminal device is located or more accurate relative position information between the terminal device and a network device, the first parameter may indicate a time instant for triggering neighboring cell measurement by the terminal device, thereby improving effect of performing neighboring cell measurement by the terminal device.

DETAILED DESCRIPTION OF THE EMBODIMENTS

Figure 1:
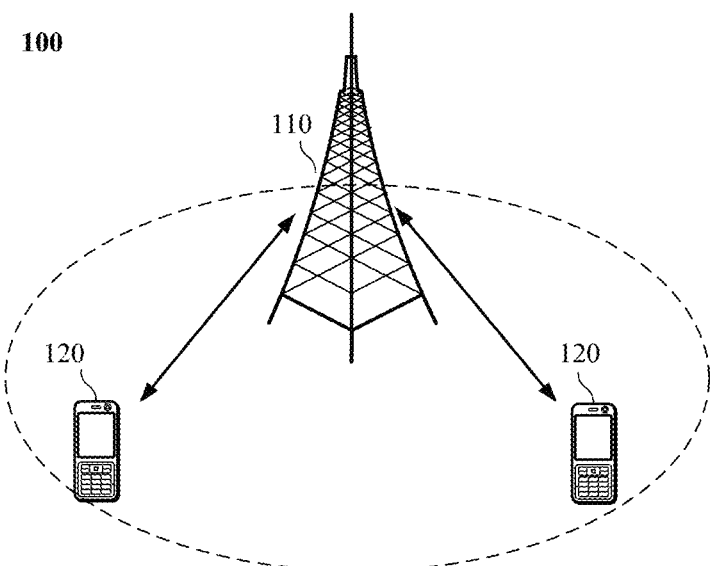
FIG. 1 shows a wireless communications system to which an embodiment of the present application is applied.

The following describes the technical solutions in embodiments of the present application with reference to the accompanying drawings in embodiments of the present application. Apparently, the described embodiments are some rather than all of embodiments of the present application. All other embodiments obtained by a person of ordinary skill in the art based on embodiments of the present application without creative efforts shall fall within the protection scope of the present application.

Embodiments of the present application may be applied to various communications systems. For example, embodiments of the present application may be applied to a global system for mobile communications (global system of mobile communication, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an advanced long term evolution (advanced long term evolution, LTE-A) system, a new radio (new radio, NR) system, an evolution system of an NR system, an LTE-based access to unlicensed spectrum (LTE-based access to unlicensed spectrum, LTE-U) system, an NR-based access to unlicensed spectrum (NR-based access to unlicensed spectrum, NR-U) system, an NTN system, a universal mobile telecommunications system (universal mobile telecommunication system, UMTS), a wireless local area network (wireless local area networks, WLAN), wireless fidelity (Wi-Fi), and a 5th generation (5th-generation, 5G) communications system. Embodiments of the present application may be further applied to another communications system, such as a future communications system. The future communications system may be, for example, a 6th generation (6th-generation, 6G) mobile communications system, or a satellite (satellite) communications system.

Conventional communications systems support a limited quantity of connections and are easy to implement. With the development of communications technologies, a communications system may support not only conventional cellular communication but also one or more other types of communication. For example, the communications system may support one or more types of the following communication: device-to-device (device to device, D2D) communication, machine-to-machine (machine to machine, M2M) communication, machine type communication (machine type communication, MTC), vehicle-to-vehicle (vehicle to vehicle, V2V) communication, vehicle-to-everything (vehicle to everything, V2X) communication, or the like. Embodiments of the present application may also be applied to a communications system that supports the foregoing communication manners.

The communications system in embodiments of the present application may be applied to a carrier aggregation (carrier aggregation, CA) scenario, a dual connectivity (dual connectivity, DC) scenario, or a standalone (standalone, SA) networking scenario.

The communications system in embodiments of the present application may be applied to an unlicensed spectrum. The unlicensed spectrum may also be considered as a shared spectrum. Alternatively, the communications system in embodiments of the present application may be applied to a licensed spectrum. The licensed spectrum may also be considered as a dedicated spectrum.

Embodiments of the present application may be applied to a terrestrial network (terrestrial networks, TN) system, or may be applied to an NTN system. For example, the NTN system may include a 4G-based NTN system, an NR-based NTN system, an Internet of things (internet of things, IoT)-based NTN system, and a narrow band-Internet of things (narrow band internet of things, NB-IoT)-based NTN system.

The communications system may include one or more terminal devices. The terminal device in embodiments of the present application may also be referred to as user equipment (user equipment, UE), an access terminal, a subscriber unit, a subscriber station, a mobile site, a mobile station (mobile station, MS), a mobile terminal (mobile Terminal, MT), a remote station, a remote terminal, a mobile device, a user terminal, a terminal, a wireless communications device, a user agent, a user apparatus, or the like.

In some embodiments, the terminal device may be a station (STATION, ST) in a WLAN. In some embodiments, the terminal device may be a cellular phone, a cordless phone, a session initiation protocol (session initiation protocol, SIP) phone, a wireless local loop (wireless local loop, WLL) station, a personal digital assistant (personal digital assistant, PDA) device, a handheld device having a wireless communication function, a computing device or any other processing device connected to a wireless modem, a vehicle-mounted device, a wearable device, a terminal device in a next generation communications system (such as an NR system) or a terminal device in a future evolved public land mobile network (public land mobile network, PLMN), or the like.

In some embodiments, the terminal device may be a device providing a user with voice and/or data connectivity. For example, the terminal device may be a handheld device, a vehicle-mounted device, or the like having a wireless connection function. In some specific examples, the terminal device may be a mobile phone (mobile phone), a tablet computer (Pad), a notebook computer, a palmtop computer, a mobile Internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

In some embodiments, the terminal device may be deployed on land. For example, the terminal device may be deployed indoors or outdoors. In some embodiments, the terminal device may be deployed on water, for example, on a ship. In some embodiments, the terminal device may be deployed in the air, for example, on an airplane, a balloon, and a satellite.

In addition to the terminal device, the communications system may further include one or more network devices. The network device in embodiments of the present application may be a device for communicating with the terminal device. The network device may also be referred to as an access network device or a wireless access network device. The network device may be, for example, a base station. The network device in embodiments of the present application may be a radio access network (radio access network, RAN) node (or device) that connects the terminal device to a wireless network. The base station may broadly cover various names below, or may be replaced with the following names, such as a NodeB (NodeB), an evolved NodeB (evolved NodeB, eNB), a next generation NodeB (next generation NodeB, gNB), a relay station, an access point, a transmitting and receiving point (transmitting and receiving point, TRP), a transmitting point (transmitting point, TP), a master MeNB, a secondary SeNB, a multi-standard radio (MSR) node, a home base station, a network controller, an access node, a wireless node, an access point (access point, AP), a transmission node, a transceiver node, a baseband unit (baseband unit, BBU), a remote radio unit (remote radio unit, RRU), an active antenna unit (active antenna unit, AAU), a remote radio head (remote radio head, RRH), a central unit (central unit, CU), a distributed unit (distributed unit, DU), and a positioning node. The base station may be a macro base station, a micro base station, a relay node, a donor node, or the like, or a combination thereof. The base station may be alternatively a communications module, a modem, or a chip that is disposed in the foregoing device or apparatus. The base station may be alternatively a mobile switching center, a device that functions as a base station in D2D, V2X, and M2M communication, a network-side device in a 6G network, a device that functions as a base station in a future communications system, or the like. The base station may support networks of the same access technology or different access technologies. A specific technology and a specific device used by the network device are not limited in embodiments of the present application.

The base station may be fixed or mobile. For example, a helicopter or an unmanned aerial vehicle may be configured to serve as a mobile base station, and one or more cells may move according to a position of the mobile base station. In another example, a helicopter or an unmanned aerial vehicle may be configured to serve as a device in communication with another base station.

In some deployments, the network device in embodiments of the present application may be a CU or a DU, or the network device includes a CU and a DU. The gNB may further include an AAU.

As an example rather than limitation, in embodiments of the present application, the network device may have a mobile feature, for example, the network device may be a movable device. In some embodiments of the present application, the network device may be a satellite or a balloon station. In some embodiments of the present application, the network device may alternatively be a base station arranged on land, water, or the like.

In embodiments of the present application, the network device may provide a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station or belong to a base station corresponding to a small cell (small cell). The small cell herein may include: a metro cell (metro cell), a micro cell (micro cell), a pico cell (pico cell), a femto cell (femto cell), or the like. These small cells have a small coverage range and low transmit power, and are suitable for providing a high-rate data transmission service.

For example, FIG. 1 is a schematic diagram of an architecture of a communications system according to an embodiment of the present application. As shown in FIG. 1, a communications system 100 may include a network device 110, and the network device 110 may be a device that communicates with a terminal device 120 (or referred to as a communications terminal or a terminal). The network device 110 may provide communication coverage for a specific geographic region, and may communicate with a terminal device within the coverage region.

The communications system 100 shown in FIG. 1 includes one network device and two terminal devices. In some embodiments of the present application, the communications system 100 may include a plurality of network devices, and another quantity of terminal devices may be included within a coverage range of each network device. This is not limited in this embodiment of the present application.

Figure 2:
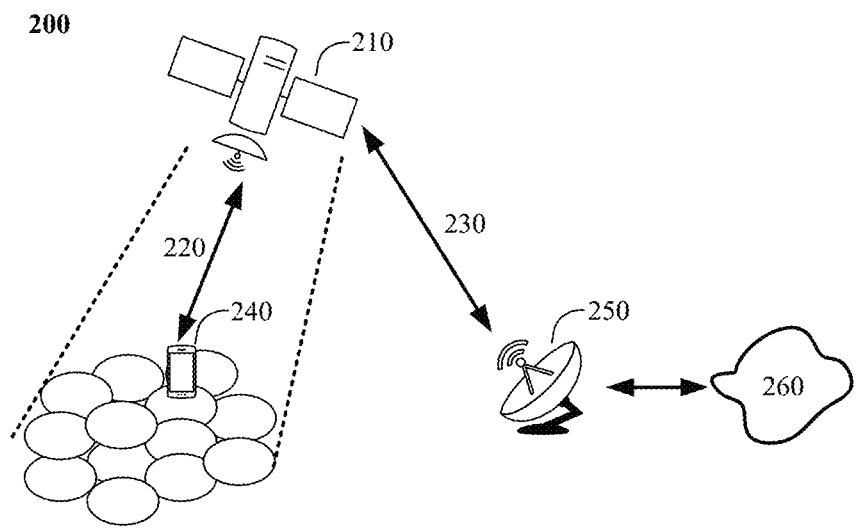
FIG. 2 shows an NTN system to which an embodiment of the present application is applied.

For example, FIG. 2 is a schematic diagram of an architecture of the foregoing NTN system. The NTN system 200 shown in FIG. 2 uses a satellite 210 as an air platform. As shown in FIG. 2, a satellite radio access network includes the satellite 210, a service link 220, a feeder link 230, a terminal device 240, a gateway (gateway) 250, and a network 260 including a base station and a core network.

The satellite 210 is a spacecraft based on a space platform. The service link 220 is a link between the satellite 210 and the terminal device 240. The feeder link 230 is a link between the gateway 250 and the satellite 210. The Earth-based gateway 250 connects the satellite 210 to a base station or a core network, depending on the architecture.

The NTN architecture shown in FIG. 2 is a bent pipe transponder architecture. In this architecture, the base station is located on the Earth behind the gateway 250, and the satellite 210 serves as a relay. The satellite 210 functions as a repeater for forwarding signals of the feeder link 230 to the service link 220, or forwarding signals of the service link 220 to the feeder link 230. In other words, the satellite 210 does not have a function of a base station, and communication between the terminal device 240 and the base station in the network 260 needs to be implemented by using the satellite 210.

Figure 3:
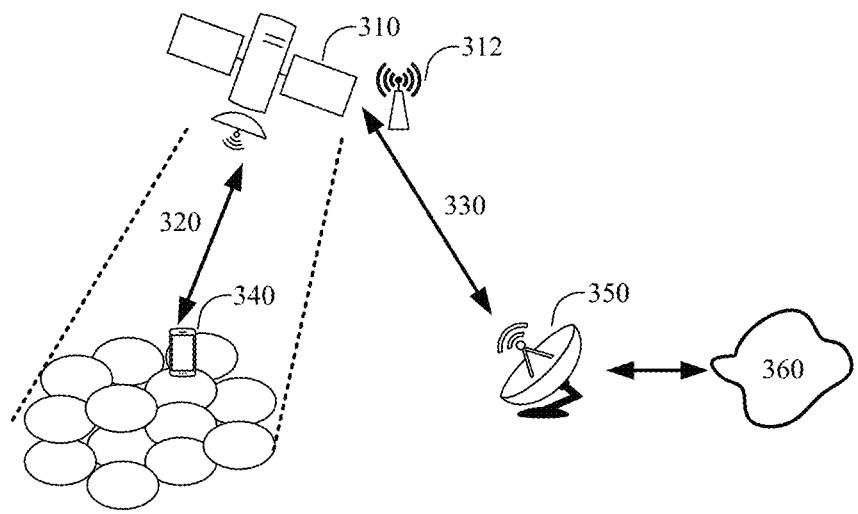
FIG. 3 shows another NTN system to which an embodiment of the present application is applied.

For example, FIG. 3 is a schematic diagram of another architecture of the NTN system. The NTN system 300 shown in FIG. 3 also uses a satellite 310 as an air platform. FIG. 3 differs from FIG. 2 in that, a base station 312 is provided on the satellite 310, and a network 360 behind a gateway 350 includes only a core network.

The NTN architecture shown in FIG. 3 is a regenerative transponder architecture. In this architecture, the satellite 310 carries the base station 312, and may be directly connected to an Earth-based core network by using a link. The satellite 310 has a function of a base station, and a terminal device 340 may directly communicate with the satellite 310. Thus, the satellite 310 may be referred to as a network device.

The communications system in the architecture shown in FIG. 2 or FIG. 3 may include a plurality of network devices, and another quantity of terminal devices may be included in a coverage range of each network device. This is not limited in this embodiment of the present application.

In embodiments of the present application, the wireless communications system shown in FIG. 1 to FIG. 3 may further include another network entity such as a mobility management entity (mobility management entity, MME) or an access and mobility management function (access and mobility management function, AMF). This is not limited in this embodiment of the present application.

It should be understood that a device having a communication function in a network/system in embodiments of the present application may be referred to as a communications device. The communications system 100 shown in FIG. 1 is used as an example. A communications device may include a network device 110 and a terminal device 120 having a communication function, and the network device 110 and the terminal device 120 may be specific devices described above. Details are not described herein again. The communications device may further include other devices in the communications system 100, such as a network controller, a mobility management entity, and other network entities. This is not limited in embodiments of the present application.

For ease of understanding, some related technical knowledge related to embodiments of the present application is first introduced. The following related technologies, as optional solutions, may be randomly combined with the technical solutions of embodiments of the present application, all of which fall within the protection scope of embodiments of the present application. Embodiments of the present application include at least part of the following content.

With the development of communications technologies, a communications system (for example, 5G) will have a market potential for integrating a satellite and a terrestrial network infrastructure. For example, 5G standards cause an NTN, including a satellite segment, to become a part of recognized 3rd generation partnership project (3rd generation partnership project, 3GPP) 5G connection infrastructure.

Communications satellites are classified into low Earth orbit (low earth orbit, LEO) satellites, medium Earth orbit (medium earth orbit, MEO) satellites, geostationary Earth orbit (geostationary earth orbit, GEO) satellites, high elliptical orbit (high elliptical orbit, HEO) satellites, and the like depending on different orbital altitudes. An LEO is an Earth-centered orbit with a height of 2,000 km or less, or at least 11.25 periods per day, and an eccentricity less than 0.25. Most artificial objects in outer space are located on the LEO. The LEO satellites operate around the Earth at a high speed (mobility), but on a predictable or definite orbit.

Satellites with different orbital altitudes have different orbital periods.

The LEO has a typical height ranging from 250 km to 1,500 km, and an orbital period ranging from 90 minutes to 120 minutes.

An MEO has a typical height ranging from 5,000 km to 25,000 km, and an orbital period ranging from 3 hours to 15 hours.

A GEO has a height of about 35,786 km, and an orbital period of 24 hours.

An NIN is a network or a network segment that uses a radio frequency (radio frequency, RF) resource on a satellite or an unmanned aerial system (unmanned aerial system, UAS) platform. A typical scenario of accessing an NTN by a terminal device involves an NTN transparent payload or an NTN regenerative payload. FIG. 2 and FIG. 3 show architectures of two NTN systems by using a satellite as an example. The bent pipe transponder architecture shown in FIG. 2 corresponds to the NTN transparent payload, and the regenerative transponder architecture shown in FIG. 3 corresponds to the NTN regenerative payload.

In a satellite communication-based NTN system, a coverage range of a serving cell is usually relatively large. The diameter of an NTN cell is at least 50 km. In some embodiments, the NTN cell may cover a plurality of cities deployed with TN cells, or may cover remote regions or ocean regions without TN cells.

In the NTN system, the satellite and the UAV system both have relatively strong mobility. A cell projected to the ground by the satellite may be fixed relative to the ground, or may move with the satellite. A serving cell corresponding to an LEO satellite is used as an example. A cell projected by the LEO satellite to the ground usually includes two types: a quasi-Earth fixed cell (fixed cell) and a quasi-Earth moving cell (moving cell).

A cell stationary relative to the ground may be a serving cell covering a fixed geographical region. For example, different LEO satellites cover the same region on the ground by adjusting angles of antennas. When one LEO satellite cannot cover the region, another LEO satellite takes over. For a satellite located on a geosynchronous orbit (geosynchronous orbit, GSO), a cell projected to the ground may also be a fixed cell.

The moving cell may be a serving cell covering a changing geographical region. For example, the cell projected by the LEO satellite to the ground may move with the satellite. Generally, when the antenna of the LEO satellite is perpendicular to the ground, the cell projected by the LEO satellite to the ground is a moving cell. Whether the LEO satellite serves as an independent base station or a relay base station, the moving cell moves with the LEO satellite, and a relative distance between the LEO satellite and the terminal device changes all the time. After a period of time, a signal of the LEO satellite may not cover the terminal device. If network deployment is relatively complete, a next LEO satellite may cover the terminal device. Because a satellite system is spherical, the next LEO satellite may be located various angles.

A projection position of a satellite in a direction perpendicular to the ground may be referred to as a satellite sub-point, or may be referred to as a reference position or a reference point. An orbit of the satellite reference position on the ground is usually aligned with an orbit of the satellite. In other words, a trajectory of the ground satellite reference point may be considered as a projection of the orbit of the satellite.

An operating parameter of the satellite may be represented by using ephemeris data. The ephemeris data generally has two formats: one format includes orbital parameters, and the other format includes position, velocity, and time (PVT) parameters. The satellite orbital parameters or PVT parameters can indicate coordinates of a position of the satellite relative to the ground. The terminal device may determine a future running trajectory of the satellite based on the ephemeris data, to determine whether measurement or handover needs to be performed.

The NTN system may include a quasi-Earth fixed system and a moving unit system. For cell measurement and reselection enhancement, different solutions are adopted for different systems. For example, for time-based cell reselection of the quasi-Earth fixed system, the network device may provide the terminal device with a time instant at which a common cell of the network device stops serving. All idle/inactive terminal devices in the cell may perform cell reselection before the time instant. For example, for position-based measurement initiation of the quasi-Earth fixed system, the network device may provide the terminal device with a reference position of the serving cell and a distance threshold. If a distance between the terminal device and a reference position of the current serving cell is greater than the distance threshold, the terminal device should perform neighboring cell measurement.

For example, the Rel-17 specification specifies a position-based measurement start rule and a time-based measurement start rule for the NTN quasi-Earth fixed cell. For the position-based measurement start rule, a distance threshold and a serving cell reference position (that is, a cell center on the ground) are introduced. If a distance between the terminal device and the serving cell reference position is less than the distance threshold and meets a conventional signal receiving condition, the terminal device may not perform priority-based neighboring cell measurement. The signal receiving condition may include a reference signal received power (reference signal received power, RSRP) condition, or may be a reference signal received quality (reference signal received quality, RSRQ) condition. Priority-based neighboring cell measurement indicates neighboring cell measurement performed based on NR frequencies with equal or lower priorities or radio access technology (radio access technology, RAT) frequencies with lower priorities. For the time-based measurement start rule, a cell stop time of a serving cell, that is, a time instant at which the cell stops covering a current region, is introduced. If the cell stop time is configured, the terminal device should start neighboring cell measurement before the cell stop time, regardless of whether the foregoing position condition or a conventional RSRP/RSRQ condition is met.

However, the foregoing solution applicable to the quasi-Earth fixed system is not applicable to the moving unit system.

For the moving unit system, the coverage region of the NTN cell moves with the network device. Even if the terminal device is fixed, a relative position between the terminal device and the network device changes. In other words, for the moving unit system, positions of both the terminal device and the serving cell may change. A moving cell of a low Earth orbit (LEO) satellite is used as an example. A typical LEO satellite velocity is 7.56 km/s. As the LEO satellite moves, a trajectory of the satellite moves over the Earth. The diameter of the NTN cell is at least 50 km. In this case, all idle/inactive terminal devices in the cell need to be distributed within 6.61 seconds. In other words, all terminal devices in the cell need to select another camping cell, and a new terminal device is to camp in the cell. According to the foregoing solution, information, provided by the network device to the terminal device, that is used for triggering cell measurement/reselection may be inaccurate, resulting in being detrimental to neighboring cell measurement or cell reselection performed by the terminal device.

As described above, the NTN cell usually covers a much larger range than the TN cell. The NTN cell covers a large quantity of low-mobility NB-IoT terminal devices. For an Earth moving cell, although the NB-IoT terminal device moves slowly, the distance between the network device and the terminal device changes obviously due to movement of the network device. Therefore, for the terminal device in the moving cell, the terminal device needs more accurate information, to perform neighboring cell measurement before the network device stops serving the terminal device.

To resolve some of the foregoing problems, an embodiment of the present application proposes a method for wireless communication. In the method, a terminal device is instructed to perform neighboring cell measurement based on a first parameter related to position information of the terminal device. The position information of the terminal device may indicate a relative position relationship between the terminal device and a serving cell, thereby being beneficial for the terminal device to better perform measurement/handover and the like. For ease of understanding, the following describes in detail main technical solutions of embodiments of the present application with reference to FIG. 4.

Figure 4:
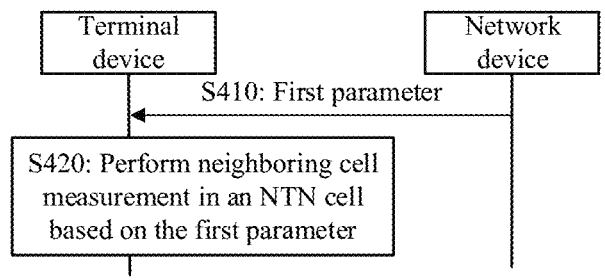
FIG. 4 is a schematic diagram of a method for wireless communication according to an embodiment of the present application.

FIG. 4 shows interaction between a terminal device and a network device. The terminal device determines a time instant for triggering neighboring cell measurement by communicating with the network device.

The terminal device may be any one of the foregoing terminal devices in an NTN cell that communicate with the network device, or may be a terminal device that performs communication in another terrestrial moving cell. In some embodiments, the terminal device may be a communications device with relatively low mobility in an NB-IoT.

In some embodiments, the terminal device may be a communications device in an idle or inactive state in an NTN cell. The terminal device may receive broadcast information or system information sent by the network device. In some embodiments, the terminal device may be a communications device in an active state. The terminal device may receive broadcast information or system information sent by the network device, or may receive dedicated signalling sent by the network device. The dedicated signalling may be used for reducing consumption of a common resource.

The network device may be a communications device that provides a network service in the NTN cell in which the terminal device is located. For example, the network device may be a satellite functioning as an independent base station, or may be an unmanned aerial vehicle system functioning as a relay base station.

The NTN cell may be a serving cell whose coverage region is stationary relative to the ground, for example, a quasi-Earth fixed cell. The NTN cell may be alternatively a serving cell whose coverage region moves with the network device, for example, a quasi-Earth moving cell. This is not limited herein.

With reference to FIG. 4, in step S410, the terminal device receives a first parameter sent by the network device.

The first parameter is used to instruct the terminal device to perform neighboring cell measurement. The first parameter may indicate a relative position relationship between the terminal device and a current serving cell, so that the terminal device determines whether the terminal device is located in an edge region of the serving cell, to better trigger neighboring cell measurement. The first parameter may be associated with one or more types of information. The information may be a distance between the terminal device and the network device. The distance may also be referred to as a service link distance, and is represented by L. A threshold of the service link distance is related to a coverage range of the NTN cell. The information may be alternatively a height of the network device from the ground. The height may also be referred to as a vertical height of the network device from the ground. The information may be alternatively an azimuth angle of an antenna of the network device. The azimuth angle is used for determining a coverage region of the NTN cell. The information may be alternatively a sub-zone in the NTN cell. The sub-zone may include a plurality of virtual regions obtained after by finely dividing the NTN cell.

The azimuth angle of the antenna of the network device may be an azimuth angle set by the antenna, or may be an azimuth angle corresponding to the network device. In some embodiments, the azimuth angle of the antenna of the network device may be a maximum azimuth angle that may be set by the antenna, or may be an azimuth angle for currently providing a network service. Therefore, the azimuth angle of the antenna may also be referred to as a maximum azimuth angle or a beam antenna angle. For example, when the NTN cell is a quasi-Earth fixed cell, an azimuth angle of an antenna of a satellite may be adjusted based on a maximum azimuth angle, to adapt to a coverage range of the NTN cell. In some embodiments, the azimuth angle of the antenna may also indicate an azimuth angle of the network device or the satellite. For example, when the satellite in the NTN system serves as a relay base station, the azimuth angle of the antenna is the azimuth angle of the satellite. Based on the azimuth angle of the satellite, relative position information between the terminal device and the satellite may be determined, or the coverage region of the respective NTN cell may be determined.

A reasonable sub-zone division manner may be beneficial for the terminal device to perform measurement/handover. The handover of the terminal device may include handover between an NTN and an NTN, between an NTN and a TN, and the like. For example, the terminal device may determine, based on a sub-zone in which the terminal device is located, whether the terminal device is at a core position of the coverage region of the NTN cell, to reduce unnecessary measurement.

To be consistent with a coverage division manner of a terrestrial TN cellular network, the sub-zone in the NTN cell is determined based on a coverage angle of the network device. A current coverage region of the network device may be determined based on the azimuth angle of the antenna of the network device. In the coverage region, an angle formed between a line between the network device and a coverage position, and a vertical line between the network device and the ground, is the coverage angle of the network device. In other words, the coverage angle of the terminal device may be determined based on a ratio of the distance between the terminal device and the network device to the height of the network device from the ground. The coverage angle may also be referred to as an offset angle. Terminal devices at different positions have different coverage angles. At an edge of the NTN cell, the coverage angle is equal to the azimuth angle of the antenna. Therefore, the coverage angle of the network device is less than or equal to the azimuth angle of the antenna.

In some embodiments, dividing the NTN cell based on the coverage angle includes determining, based on the azimuth angle of the antenna, a plurality of coverage angles corresponding to a plurality of sub-zones. The plurality of coverage angles may be an arithmetic progression, or may be not an arithmetic progression. For example, when the azimuth angle of the antenna is 60 degrees, the coverage angles corresponding to the plurality of sub-zones may be respectively 15 degrees, 30 degrees, 45 degrees, and 60 degrees. In other words, the NTN cell is divided into four sub-zones based on the azimuth angle, and a boundary of each sub-zone is determined based on the coverage angles corresponding to the four sub-zones. For another example, at the edge of the cell, the coverage angle of the satellite is $\alpha_{max}$. The angle may be divided into $\alpha_1, \alpha_2, \alpha_3, \ldots,$ and $\alpha_i$, where $\alpha_1 < \alpha_2 < \alpha_3 < \ldots < \alpha_i \leq \alpha_{max}$.

In a possible implementation, the plurality of sub-zones obtained by dividing the NTN cell may be a plurality of circular or ring-shaped regions centered on a projection position of the network device in a direction perpendicular to the ground. When the NTN cell includes N sub-zones (N is a natural number greater than 1), N coverage angles respectively corresponding to boundaries of the N sub-zones away from the center of the circle meet the following condition:

$$0 < \alpha_i < \alpha_{i+1} \leq \alpha_N.$$

In which, $\alpha_i$ is a coverage angle corresponding to a boundary, away from the center of the circle, of an $i^{th}$ sub-zone in the N sub-zones, i is a natural number ranging from 1 to N−1, and $\alpha_N$ is the azimuth angle of the antenna.

In a possible implementation, the plurality of sub-zones may be obtained by equally or unequally dividing the coverage region of the NTN cell. For example, when the NTN cell includes the N sub-zones, the N sub-zones may be obtained by equally dividing the NTN cell. In other words, the areas of the N sub-zones may be equal. For another example, the areas of the N sub-zones may be partially equal, or all of the areas of the N sub-zones are unequal.

In some embodiments, the sub-zone in the NTN cell may be alternatively determined based on the projection position of the network device in the direction perpendicular to the ground. The projection position may be referred to as a first position. The NTN may determine a boundary of the sub-zone based on a coverage angle. The boundary of the sub-zone includes a curve centered on the first position. The first position may be determined based on coordinates of the network device. For example, the terminal device may determine an orbit parameter or a PVT parameter of the network device based on ephemeris data of the network device. These parameters may be used for determining the coordinates of a position of the network device projected to the ground. Position information of the plurality of sub-zones of the NTN cell may be determined based on the first position and the coverage angles.

In some embodiments, when the NTN cell is divided based on the coverage angles, a plurality of other pieces of information may also be considered. In other words, the plurality of virtual sub-zones in the NTN cell may be alternatively determined based on one or more types of other related information. Other related information may include: the coordinates of the network device, a geographical environment of the coverage region of the NTN cell, distribution of the TN cell in the coverage region of the NTN cell, a limitation on signal interaction of the NTN cell, a measurement requirement and/or a handover requirement of the terminal device, or auxiliary information provided by the terminal device. For example, a quantity of sub-zones may be increased by increasing a value of N based on the foregoing other related information, so that the NTN cell is finer divided.

In a possible implementation, the sub-zone in the NTN cell may be adaptively adjusted based on the coordinates of the network device and a coverage status of the TN. For example, the quantity of sub-zones may be increased when the coordinates indicate that the network device is located in a densely populated region or there are a relatively large quantity of TN cells in the NTN cell. By increasing the quantity of sub-zones, handover can be more accurately performed between the NTN cell and the TN cell.

In a possible implementation, the sub-zone in the NTN cell may be adaptively adjusted based on the geographical environment of the coverage region. For example, the quantity of sub-zone may be reduced when a main region covered by the NTN cell is a sea or a desert. Because there are a relatively small quantity of TN cells in this region, a probability of handover to a TN cell is small.

In a possible implementation, the sub-zone in the NTN cell may be determined based on the limitation on signal interaction of the NTN cell. For example, when there are a relatively large quantity of TN cells in the NTN cell and there are a relatively large quantity of sub-zones, the terminal device needs to frequently perform signal interaction with the network device, to meet requirements for performing measurement or handover in different sub-zones. When the network device is a satellite, a transmission delay is relatively large. To reduce interaction, the quantity of sub-zones may be reduced.

In a possible implementation, the sub-zone in the NTN cell may be determined based on the measurement requirement and/or the handover requirement of the terminal device. For example, when an accuracy requirement of measurement or handover of the terminal device is high, the quantity of sub-zones may be increased to reduce a determining offset of subsequent measurement and handover, thereby reducing power consumption.

In a possible implementation, the sub-zone in the NTN cell may be alternatively determined based on auxiliary information provided by the terminal device. For example, the terminal device may provide the network device with information about an environment surrounding the terminal device, or position information determined in another manner. The network device may determine the quantity of sub-zones based on auxiliary information provided by a plurality of terminal devices.

In conclusion, to determine a division manner of the NTN cell and a quantity of sub-zones obtained through division, in addition to the coverage angle and the position of the network device, a ground condition of coverage of the NTN cell, the distribution of the TN cells in the coverage region, a communication requirement, and the auxiliary information provided by the terminal device may be further taken into account, so that the NTN cell is more accurately divided and can be better adapted to a covered geographical region.

Figure 5:
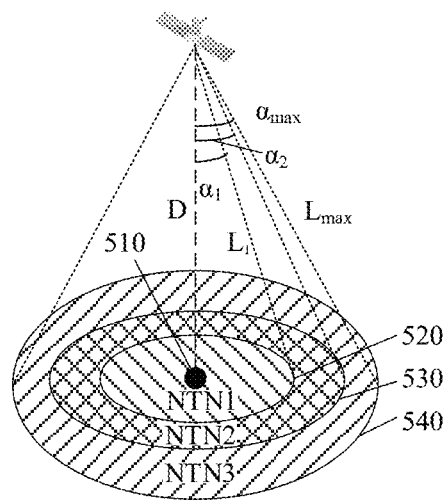
FIG. 5 is a schematic diagram of a division manner of an NTN cell according to an embodiment of the present application.

The following specifically describes the division manner of the NTN cell provided in this embodiment of the present application with reference to FIG. 5.

With reference to FIG. 5, a projection of a network device in a direction perpendicular to the ground is located a first position 510, and an azimuth angle of an antenna is a maximum azimuth angle $\alpha_{max}$ of the network device. An NTN cell is divided into three sub-zones based on the azimuth angle, that is, respectively NTN1, NTN2, and NTN3. As shown in FIG. 5, boundaries of the three sub-zones are centered on the first position 510. Specifically, a boundary curve 520 of the sub-zone NTN1 is a circle centered on the first position 510. A boundary of the sub-zone NTN2 includes curves 520 and 530. The curve 530 is also a circle centered on the first position 510. Similarly, a boundary of the sub-zone NTN3 includes curves 530 and 540. The curve 540 is also a circle centered on the first position 510.

As shown in FIG. 5, coverage angles of the network device that correspond to the boundaries of the plurality of sub-zones are less than or equal to the azimuth angle of the antenna. A coverage angle corresponding to the boundary curve 520 of the sub-zone NTN1 is $\alpha_1$, where $\alpha_1$ is less than $\alpha_{max}$. Coverage angles corresponding to the two boundary curves of the sub-zone NTN2 are respectively $\alpha_1$ and $\alpha_2$ that are both less than $\alpha_{max}$. A coverage angle corresponding to the inner boundary curve 530 of the sub-zone NTN3 is $\alpha_2$, and a coverage angle corresponding to the outer boundary curve 540 is equal to $\alpha_{max}$.

A coverage angle corresponding to a terminal device in a sub-zone is within a coverage angle range corresponding to a boundary of the sub-zone. For example, a coverage angle corresponding to a terminal device in the sub-zone NTN1 is less than or equal to a1.

It should be understood that the concentric circle division manner shown in FIG. 5 is merely an example, and another division manner based on the coverage angle is also applicable to the present application. For example, a plurality of elliptic sub-zones may be determined based on the coverage angle of the network device in a plurality of directions.

The division manner of the NTN cell described with reference to FIG. 5 may be applied to a quasi-Earth fixed cell and a quasi-Earth moving cell. For different cell types, position changes of the terminal device relative to the network device are different. Details are described below.

The division manner of the NTN cell shown in FIG. 5 may be consistent with coverage division of a terrestrial TN cellular network. In this division manner, an NTN network can be better coupled to the terrestrial cellular system, to reduce a blind region of measurement. In addition to division based on an azimuth angle, the NTN cell of the antenna may be divided in other manners. The following briefly describes the division manner with reference to FIG. 8 and FIG. 9.

Returning to step S410 shown in FIG. 4, the first parameter may be used for instructing, based on position information of the terminal device in the NTN cell, the terminal device to perform neighboring cell measurement. The position information may be used for determining relative position information between the terminal device and the corresponding network device. In some embodiments, the relative position information may be used for determining whether the terminal device is located in an edge region of a current serving cell. For example, the terminal device may determine, based on a distance between the network device and the terminal device associated with the first parameter, a time instant for arriving at an edge. In some embodiments, the relative position information may be used for determining a sub-zone in which the terminal device is located. Different measurement/handover modes may be set for sub-zones in the NTN cell. The terminal device may reasonably perform measurement based on information about the sub-zone in which the terminal device is located.

The relative position information between the terminal device and the network device may include a relative distance or a relative angle between the terminal device and the network device. In some embodiments, the first parameter may directly indicate the relative position information by associating a plurality of types of information. For example, the first parameter may be the distance between the terminal device and the network device. In some embodiments, the terminal device may determine the relative position information based on the plurality of pieces of association information. For example, the first parameter may be used for determining, based on the distance between the terminal device and the network device and the height of the network device from the ground, the coverage angle of the network device corresponding to the terminal device.

In some embodiments, the first parameter may be directly one or more of the foregoing pieces of association information. For example, the first parameter received by the terminal device is the height of the network device from the ground, or the azimuth angle of the antenna of the network device, or the division manner of the sub-zone. In some embodiments, the first parameter may be other information for obtaining one or more of the foregoing types of association information. For example, the first parameter may be ephemeris data of a serving satellite. If an orbit parameter of the satellite in the ephemeris data is available, the terminal device may know and predict a position of the serving satellite and position coordinates of a satellite sub-point in a real-time manner. The terminal device may determine information of a position relative to the serving satellite based on the data. For another example, the first parameter may be information related to the sub-zone in the NTN cell. The terminal device may determine, based on the related information, the sub-zone in which the terminal device is located, to determine the relative position relationship between the terminal device and the network device. For another example, the first parameter may be a reference signal sent by the network device. The terminal device may determine the distance between the terminal device and the network device based on a received RSRP.

In step S420, the terminal device performs neighboring cell measurement in the NTN cell based on the first parameter.

Neighboring cell measurement may also be referred to as adjacent cell measurement. Neighboring cell measurement may include measurement of an adjacent cell, or may include related measurement used for triggering neighboring cell measurement. When the terminal device performs neighboring cell measurement, the adjacent cell may be an NTN cell or a TN cell. This is not limited herein.

In some embodiments, the terminal device may perform neighboring cell measurement to prepare for cell reselection. In other words, after the terminal device triggers neighboring cell measurement, a measurement result of the neighboring cell may be used by the terminal device to perform cell reselection.

As described above, the first parameter may indicate the relative position relationship between the terminal device and the serving cell. The association information of the first parameter may be used for determining the relative position relationship, to indicate whether the terminal device triggers neighboring cell measurement.

The terminal device may perform neighboring cell measurement based on a plurality of trigger factors. The trigger factor may include a time, a distance, an angle, or the sub-zone in which the terminal device is located.

In some embodiments, the terminal device may trigger neighboring cell measurement based on the time. In a possible implementation, the terminal device may determine, based on the first parameter, the time instant for arriving at the edge of the NTN cell; and may determine, based on the time instant, whether to trigger neighboring cell measurement. For example, for a quasi-Earth fixed cell, the serving cell may provide a service stop time. The terminal device may set a time measurement threshold with reference to the service stop time and movement information of the terminal device. When the time instant for arriving at the edge of the NTN cell is less than the time measurement threshold, the terminal device triggers neighboring cell measurement. For example, in a case that the terminal device and the serving cell move relative to each other for a quasi-Earth moving cell, the terminal device may also determine, based on the time measurement threshold, whether to trigger neighboring cell measurement.

In a possible implementation, the first parameter may be determined based on the ratio of the distance between the terminal device and the network device to the height of the network device from the ground. For example, when the height of the network device from the ground is D and the distance between the terminal device and the network device is L, the ratio (D/L) may be used for determining the coverage angle α of the network device corresponding to the terminal device. Specifically, α=arccos (D/L).

In a possible implementation, the network device may notify the terminal device of the first parameter by using broadcast information/system information/dedicated signalling. The terminal device may determine a second parameter based on the first parameter. The second parameter is used to indicate the time instant for arriving at the edge of the NTN cell by the terminal device. For example, when the first parameter includes the ephemeris data of the network device, the terminal device may determine the distance to the network device and the height of the network device from the ground based on the ephemeris data, to determine a corresponding coverage angle. To obtain the time instant for arriving at the edge of the NTN cell by the terminal device, the second parameter may be alternatively determined based on the azimuth angle of the antenna. The time instant for arriving at the edge of the cell by the terminal device may be determined based on the azimuth angle of the antenna and the coverage angle corresponding to the terminal device, to determine whether to perform neighboring cell measurement.

For example, the time instant t for arriving at the edge of the NTN cell by the terminal device may be determined by using the following formula:

$$t = (\alpha_N - \alpha_n)/\Delta\gamma.$$

In which, an is the azimuth angle ($\alpha_{max}$ shown in FIG. 5) of the antenna of the network device, an is the coverage angle of the network device corresponding to a position of the terminal device, $\Delta\gamma$ is a relative angular velocity, $\Delta\gamma=\gamma_1-\gamma_2$, $\gamma_1$ is an angular velocity of the network device, and $\gamma_2$ is a rotational angular velocity of the Earth.

In another possible implementation, the terminal device may set a time measurement threshold. When the time instant for arriving at the edge of the NTN cell by the terminal device is less than the time measurement threshold, neighboring cell measurement may be triggered. Time measurement thresholds of different terminal devices may be the same or different.

In another possible implementation, the network device may notify the terminal device of the division manner of the NTN cell. A coverage range of the NTN cell is relatively large. If all terminal devices in an NTN cell each set calculation and communication of a time instant for arriving at the edge of the NTN cell, a calculation amount is large. The terminal device may alternatively determine, based on a time range including the time instant for arriving at the edge of the NTN cell, whether to trigger neighboring cell measurement. The three sub-zones shown in FIG. 1 are used as an example. Regardless of whether the terminal device is in NTN1, NTN2, or NTN3, the time instant t for arriving at the edge of the cell by the terminal device may meet the following condition:

$$t = (\alpha_N - \alpha_i)/\Delta\gamma.$$

In which, $\alpha_N$ is the azimuth angle ($\alpha_{max}$ shown in FIG. 5) of the antenna of the network device, $\alpha_i$ is a coverage angle that corresponds to a boundary, away from the first position, of the $i^{th}$ sub-zone in the N sub-zones, i is a natural number ranging from 1 to N−1, $\Delta\gamma$ is a relative angular velocity, $\Delta\gamma=\gamma_1-\gamma_2$, $\gamma_1$ is an angular velocity of the network device, and $\gamma_2$ is a rotational angular velocity of the Earth.

It may be learned from the foregoing description that time instants for arriving at an edge of a cell by terminal devices in different sub-zones may be different. The time instant for arriving at the edge of the cell can be used for triggering neighboring cell measurement in a quasi-Earth fixed cell and a quasi-Earth moving cell.

Specifically, when the NTN cell includes N sub-zones, boundaries of the N sub-zones each correspond to one time instant, and therefore, the N sub-zones may correspond to N time regions. Two boundaries of an edge sub-zone of the NTN cell may correspond to one time range. The terminal device may set the time measurement threshold based on the time range. In other words, a range of the time measurement threshold may correspond to the edge sub-zone of the NTN cell. The terminal device performs neighboring cell measurement at a start time instant of the time measurement threshold. The edge sub-zone of the NTN cell may also be referred to as an edge sub-zone.

For example, the network device may provide the terminal device with the vertical height of the network device from the ground, the distance between the terminal device and the network device, and the azimuth angle of the antenna by using broadcast information/system information/dedicated signalling. The terminal device may calculate, based on a service link distance and a vertical height of the satellite from the ground, a coverage angle range of the sub-zone in which the terminal device is located. According to a formula $t=(\alpha_N-\alpha_i)/\Delta\gamma$, a time instant for arriving at the edge of the cell from the sub-zone in which the terminal device is located may be obtained, so that the terminal device initiates measurement and/or handover.

The sub-zone division manner shown in FIG. 5 is used as an example. The NTN cell is divided into three regions: NTN1, NTN2, and NTN3. Time instants for arriving at the edges of the three regions are respectively t1, t2, and t3. The terminal device may set a time threshold for triggering measurement. Setting of the time threshold is determined based on an NTNx ring range, closest to the edge, obtained through division of the NTN cell. If the time measurement threshold is t, a corresponding value of t in FIG. 5 is [t2, t3]. Herein, t2 is a time instant at which the terminal device starts to perform normal neighboring cell evaluation and prepare for cell reselection. Therefore, at a time interval [t2, t3], the terminal device may start to perform normal neighboring cell measurement, to prepare for a next time of cell reselection.

In some embodiments, the terminal device may trigger neighboring cell measurement based on the distance. The terminal device may determine the distance between the terminal device and the network device based on the first parameter, and determine, based on the distance, whether to trigger neighboring cell measurement. For example, for a quasi-Earth fixed cell, the network device may provide the terminal device with a reference position for calculating the distance. The terminal device may trigger neighboring cell measurement based on a distance threshold provided by the network device, or may trigger neighboring cell measurement with reference to the movement information of the terminal device. The terminal device may further estimate, based on the reference position and the distance threshold, a time instant at which the serving cell stops providing coverage at the current position. Terminal devices with different distances to the edge of the cell correspond to different service stop times. For example, for a quasi-Earth moving cell, the terminal device may determine the distance between the terminal device and the edge of the cell based on relative movement information, to trigger neighboring cell measurement.

In a possible implementation, based on the division manner of the cell shown in FIG. 5, the terminal device may determine the distance between the terminal device and the network device based on the first parameter, and determine a distance between the edge of the cell and the network device based on the azimuth angle of the antenna. Based on the two distances, a distance between the terminal device and the edge of the NTN cell may be obtained, to determine whether to trigger neighboring cell measurement. As shown in FIG. 5, the distance between the edge of the NTN cell and the network device is $L_{max}$. When the distance L between the terminal device and the network device is close to $L_{max}$, neighboring cell measurement may be triggered. For example, a threshold may be set, so that neighboring cell measurement is triggered when the difference between L and $L_{max}$ are less than the threshold.

In a possible implementation, the terminal device may determine the second parameter based on the foregoing first parameter. The second parameter may be used to indicate the distance between the terminal device and the edge of the NTN cell. The terminal device may determine, based on the distance between the terminal device and the edge of the NTN cell, whether to trigger neighboring cell measurement. Specifically, the terminal device may set a distance threshold. When the distance between the terminal device and the edge of the cell is less than the threshold, neighboring cell measurement is triggered. For example, the terminal device may determine the edge of the NTN cell based on the azimuth angle of the antenna. The terminal device may determine a distance between the terminal device and the first position based on the service link distance and the height of the network device from the ground, so that the distance between the terminal device and the edge of the cell can be determined.

In a possible implementation, the second parameter may be alternatively determined based on other information. The other information may include: an offset (offset) determined by the network device based on the reference position, the ephemeris data of the network device, a moving speed of the network device, a motion trajectory of the network device, or may be movement information of the terminal device. The offset, the ephemeris data, the moving speed, and the motion trajectory that are related to the network device may be referred to as first information. The terminal device may receive the first information by using broadcast information, system information, or dedicated signalling of the network device. Various types of information in the first information may be mutually converted. For example, the motion trajectory of the network device may be determined based on the ephemeris data, and the offset may also be determined based on the moving speed of the network device.

For example, the second parameter may be determined based on the movement information of the terminal device and the time instant for arriving at the edge of the NTN cell. The time instant for arriving at the edge of the NTN cell by the terminal device may be determined based on the first parameter or in another manner. Specifically, the terminal device may calculate the distance between the terminal device and the edge of the cell based on a speed of the terminal device and the time instant for arriving at the edge of the cell. Based on the distance and the speed, the terminal device may determine when to initiate measurement based on the distance.

For example, the second parameter may be used for determining an offset of the network device in a time period based on the motion trajectory and the moving speed of the network device. Real-time position information of the network device may be determined based on the offset. The terminal device may determine the distance between the terminal device and the network device based on the position information of the terminal device and the real-time position information. Whether to trigger neighboring cell measurement may be determined based on the distance and the coverage region of the network device.

In a possible implementation, in continuous movement, the network device may notify the terminal device of the ephemeris data by using broadcast information/system information/dedicated signalling. The terminal device may obtain, based on the ephemeris data, positions of the network device at different time points. For example, a position of a satellite sub-point of the network device at a first time point may be referred to as a reference position, and a position of a satellite sub-point of the network device at a second time point may be determined based on the reference position and the offset. Therefore, the terminal device may calculate a real-time reference position of the network device and a current real-time position of the terminal device. The terminal device may determine, based on the position information, the time instant for arriving at the edge of the cell, to determine when to initiate cell measurement and cell handover.

In an example, the reference position of the network device is a first projection position, corresponding to the first time point, of the network device. A second projection position corresponds to the second time point. The offset is a distance between the second projection position and the first projection position. The offset may be used for determining the distance between the terminal device and the network device at the second time point. The first projection position and the second projection position may be used for determining the motion trajectory of the network device.

In another example, the distance between the terminal device and the network device at the second time point may be alternatively determined based on the position information of the terminal device. The position information of the terminal device may be determined based on an observed time difference of arrival (observed time difference of arrival, OTDOA), global navigation satellite system (global navigation satellite system, GNSS) auxiliary information, or other positioning information.

Figure 6:
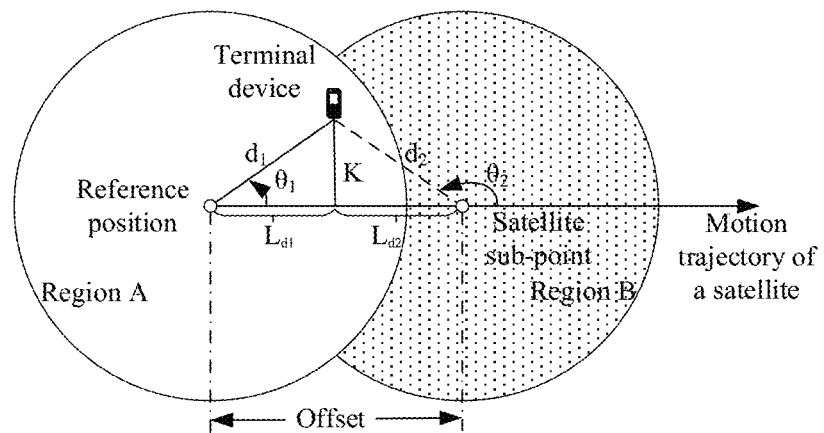
FIG. 6 is a schematic diagram of a structure of a possible implementation of the method shown in FIG. 4.

For ease of understanding, the following uses a quasi-Earth moving cell as an example to describe in detail a possible implementation of a distance-based measurement trigger solution with reference to FIG. 6. FIG. 6 is a plan view of an NTN cell.

With reference to FIG. 6, a network device moves along a motion trajectory of the network device. At a first time point, a first projection of the network device is located at a reference position shown in FIG. 6, and a coverage region of the network device is a region A. At a second time point, a second projection of the network device is located at a satellite sub-point shown in FIG. 6, and a coverage region of the network device is a region B. As shown in FIG. 6, the terminal device falls within both a coverage range of the region A and a coverage range of the region B. A vertical distance between the terminal device and the motion trajectory of the network device may be represented by K, where K is usually a constant. The motion trajectory of the network device is used as a reference. In FIG. 6, $\theta_1$ and $\theta_2$ are respectively an angle between a line between the reference position and the terminal device and a line between the reference position and the satellite sub-point in the plane view, and an angle between a line between the satellite sub-point and the terminal device and the line between the reference position and the satellite sub-point in the plane view. $d_1$ is a distance between the reference position and the terminal device, and $d_2$ is a distance between the satellite sub-point and the terminal device.

From the first time point to the second time point, the network device moves from the reference position to the satellite sub-point. At the first time point, the terminal device in the region A may determine a sub-zone in which the terminal device is located, and may calculate a distance between the terminal device and an edge and the distance between the terminal device and the reference position. For example, the terminal device may determine $d_1$ and $\theta_1$ through communication with the network device. For another example, the terminal device may alternatively determine $\theta_1$ through OTDOA positioning or based on GNSS auxiliary information or other positioning information. At the second time point, the terminal device is not sure of a position of the network device, or the terminal device has not established a connection to the network device.

It may be learned from the foregoing description that K is a constant and K may be expressed as follows: K=$d_1$ sin $\theta_1$=$d_2$ sin $\theta_2$. Therefore, the distance $d_2$ between the terminal device and the network device at the second time point meets the following condition:

$$d_2 = d_1 \sin\theta_1 / \sin\theta_2.$$

In which, $d_1$ represents the distance between the terminal device and the network device at the first time point, $d_2$ represents the distance between the terminal device and the network device at the second time point, $\theta_1$ represents the included angle between the motion trajectory and a line between the terminal device and the reference position, $\theta_2$ represents the included angle between the motion trajectory and a line between the terminal device and the second projection position, and $\theta_2$ meets the following condition:

$$\theta_2 = 180 - arctg[d_1 \sin\theta_1 / (L_{offset} - d_1 \cos\theta_1)].$$

In which, $L_{offset}$ represents an offset determined by the network device based on the reference position at the second time point.

When the terminal device obtains $d_2$, it indicates that the terminal device can obtain a distance between the terminal device and an edge of a cell in the region B. A service time in the region B can also be known based on a moving speed of a satellite. Based on the distance to the edge and the service time, the terminal device may determine a time or a distance for initiating neighboring cell measurement.

In some embodiments, the terminal device may trigger neighboring cell measurement based on an angle. In a possible implementation, the terminal device may determine a relative angle between the terminal device and the network device based on a first parameter. The relative angle may be a coverage angle of the network device corresponding to the terminal device. The coverage angle of the network device may be an included angle formed between a line between the network device and a covered position and a vertical line between the network device and the ground. The coverage angle is usually less than or equal to an azimuth angle of an antenna. $\alpha_{max}$ in FIG. 6 is a coverage angle corresponding to an edge of the network device. The coverage angle is equal to the azimuth angle of the antenna. For example, for a quasi-Earth moving cell, a coverage angle corresponding to the terminal device changes with relative movement between the network device and the terminal device. The terminal device may determine, based on a difference between the coverage angle and the azimuth angle of the antenna, whether to trigger neighboring cell measurement.

In a possible implementation, the terminal device may determine a second parameter based on the first parameter. The second parameter is used to indicate the coverage angle of the network device corresponding to the terminal device. The terminal device may determine, based on the coverage angle corresponding to the terminal device, whether to trigger neighboring cell measurement.

In another possible implementation, when a relative position relationship between the network device and the terminal device changes at a time instant, the network device may notify the terminal device of ephemeris data by using broadcast information/system information/dedicated signalling. The terminal device obtains a current offset angle of the terminal device relative to the network device based on a current service link distance and a height of the network device from the ground, that is, the corresponding coverage angle. For example, when a service link distance of a terminal device m is $L_m$ and a height is D, a coverage angle $\alpha_m$ corresponding to the terminal device is equal to arccos (D/$L_m$). The maximum coverage angle of the network device $\alpha_{max}$ is equal to arccos (D/$L_{max}$). A satellite is used as an example. In a motion orbit of the satellite, it may be approximately considered that heights of the satellite from all satellite sub-points are the same. If $\alpha_m < \alpha_{max}$, it may be considered that the terminal device is in a coverage region of the satellite. If $\alpha_m > \alpha_{max}$, it may be considered that the terminal device is outside a coverage region of the satellite. Therefore, neighboring cell measurement may be triggered based on the coverage angle corresponding to the terminal device.

In another possible implementation, when the NTN cell includes N sub-zones determined based on the coverage angle, N angle regions in a one-to-one correspondence with the N sub-zones may be determined based on an azimuth angle of the antenna. If the coverage angle corresponding to the terminal device falls within an angle region including the azimuth angle of the antenna, the terminal device triggers neighboring cell measurement. In other words, if the coverage angle corresponding to the terminal device falls within a last sub-zone including an edge of the NTN cell, neighboring cell measurement is triggered.

The three sub-zones obtained through division in FIG. 5 are taken as an example. In this case, coverage angles corresponding to outer boundaries of the three sub-zones are respectively $\alpha_1$, $\alpha_2$, and $\alpha_3$. $\alpha_1$=arccos(D/$L_1$), $\alpha_2$=arccos(D/$L_2$), and $\alpha_3$=arccos(D/$L_3$). In which, $\alpha_3=\alpha_{max}$, and $L_3=L_{max}$. An angle region corresponding to the sub-zone NTN1 is [0, $\alpha_1$]. An angle region corresponding to the sub-zone NTN2 is [$\alpha_1$, $\alpha_2$]. An angle region corresponding to the sub-zone NTN3 is [$\alpha_2$, $\alpha_3$]. If the coverage angle corresponding to the terminal device falls within the range [$\alpha_2$, $\alpha_3$], the terminal device may initiate neighboring cell measurement. [$\alpha_2$, $\alpha_3$] corresponds to the sub-zone NTN3. The sub-zone NTN3 may also be referred to as a relaxation measurement region.

In some embodiments, the terminal device may trigger neighboring cell measurement based on a sub-zone in which the terminal device is located. In a possible implementation, when a distance between the terminal device and an edge of an NTN cell may be indicated in a sub-zone division manner of the NTN cell, the terminal device may determine, based on the sub-zone in which the terminal device is located, whether to trigger neighboring cell measurement. For example, for a quasi-Earth moving cell, as a position of a serving cell changes, the sub-zone in which the terminal device is located when being still also changes.

In a possible implementation, the terminal device may determine, based on the first parameter, a sub-zone in which the terminal device is located, and determine, based on the sub-zone in which the terminal device is located, whether to trigger neighboring cell measurement. For example, the terminal device may determine, based on a current service link distance and a height of the network device from the ground, a specific sub-zone in which the terminal device is located in the NTN cell. As the network device moves and the terminal device is located in an edge sub-zone of the NTN cell, the terminal device may trigger neighboring cell measurement, or may calculate a time instant for arriving at the edge of the cell, to determine whether a handover or measurement operation is to be performed. FIG. 5 is used as an example. When the terminal device is located in the sub-zone NTN3, neighboring cell measurement may be triggered.

Figure 7:
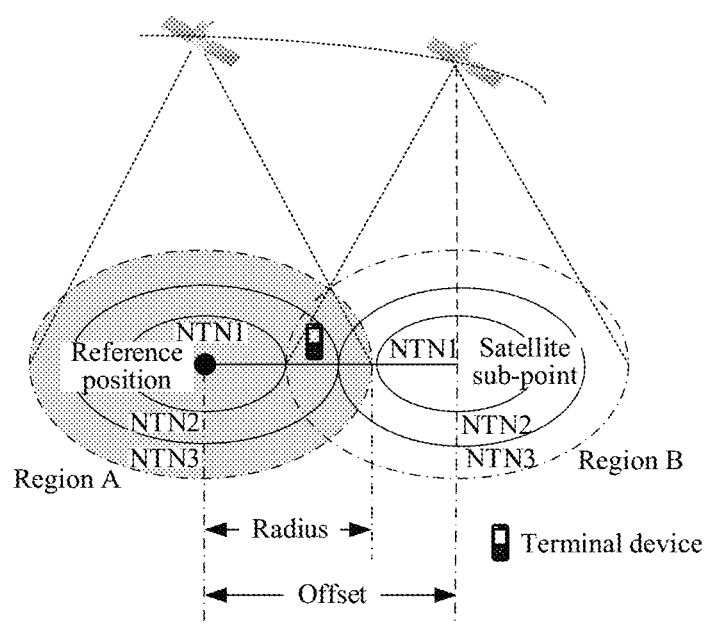
FIG. 7 is a schematic diagram of a possible implementation of determining a sub-zone in which a terminal device in a moving cell is located.

For ease of understanding, the following uses a quasi-Earth moving cell as an example to describe a possible implementation with reference to FIG. 7.

With reference to FIG. 7, at a time instant T0, a terminal device is located in a sub-zone NTN2 in a region A. As a network device moves, at a time instant T1, the terminal device is located in a sub-zone NTN3 in a region B. In this case, the terminal device needs to recalculate a service time in the region B and a distance to an edge of a cell. The terminal device may determine a related parameter of the network device by periodically receiving a broadcast message/an upper-layer signaling message of the network device. For example, the related parameter is a cell radius and an offset of the network device shown in FIG. 7. The terminal device may recalculate, based on these parameters, a time instant for arriving at the edge of the cell by the terminal device, and determine whether a handover or measurement operation is to be performed.

In some embodiments, the terminal device may determine, based on a first parameter and a relaxation measurement region, whether to trigger neighboring cell measurement. The relaxation measurement region may correspond to a plurality of parameters to determine a plurality of parameter ranges for triggering neighboring cell measurement. When a parameter corresponding to the terminal device falls within the parameter range, neighboring cell measurement is triggered. When a parameter corresponding to the terminal device falls outside the parameter range, the terminal device does not need to perform neighboring cell measurement or further calculation and measurement that are related to neighboring cell measurement. A quantity of times of measurement performed by the terminal device can be reduced by setting the relaxation measurement region, thereby reducing power consumption.

In a possible implementation, the relaxation measurement region may correspond to the foregoing time parameter, the distance parameter, and the angle parameter. According to a parameter range corresponding to the relaxation measurement region, the terminal device may determine, based on the first parameter, the parameter corresponding to the terminal device, to determine whether neighboring cell measurement is to be triggered.

For example, the relaxation measurement region may correspond to a coverage angle of the network device. The coverage angle shown in FIG. 5 is used as an example. The parameter range corresponding to the relaxation measurement region may be set to $[\alpha_2, \alpha_3]$. A coverage angle corresponding to the terminal device is determined based on the first parameter. If the coverage angle corresponding to the terminal device does not belong to $[\alpha_2, \alpha_3]$, the terminal device does not need to perform a test related to neighboring cell measurement, thereby being beneficial to reduce power consumption. If the coverage angle corresponding to the terminal device belongs to $[\alpha_2, \alpha_3]$, neighboring cell measurement is triggered.

For example, the relaxation measurement region may correspond to a distance between the terminal device and the network device. A parameter range corresponding to the relaxation measurement region may be set to $[L_2, L_3]$. The distance between the terminal device and the network device may be directly determined based on the first parameter. Only when the distance between the terminal device and the network device falls within the range $[L_2, L_3]$, the terminal device triggers neighboring cell measurement.

In the foregoing embodiment, the terminal device may determine, based on a sub-zone in which the terminal device is located, whether to perform related measurement for triggering neighboring cell measurement. To be specific, the terminal device may first determine the sub-zone in which the terminal device is located, and only when the terminal device is located in an edge sub-zone, perform the foregoing related measurement of a time, a distance, or an angle for triggering neighboring cell measurement. FIG. 5 is still used as an example. If the terminal device is located in NTN2, the terminal device does not need to trigger neighboring cell measurement, and does not need to calculate or measure a parameter to be compared with a threshold. Therefore, based on finer cell division, the terminal device can better perform measurement, improve effect of performing neighboring cell measurement by the terminal device, and reduce power consumption of the terminal device by reducing unnecessary measurement.

As mentioned above, the division manner of the NTN cell described with reference to FIG. 5 may be applied to a quasi-Earth fixed cell and a quasi-Earth moving cell.

For a quasi-Earth fixed cell, a coverage range of the NTN cell may be divided into a plurality of sub-zones. For example, the coverage range of the NTN cell of the quasi-Earth fixed cell may be equally divided into n sub-zones in the manner shown in FIG. 5, or may be unequally divided into several sub-zones based on TN coverage degrees and ranges.

In a case of the quasi-Earth fixed cell, the coverage range of the NTN cell remains unchanged, but a relative distance between the network device and the terminal device changes constantly. After a period of time, it is possible that a signal of the current network device can not cover the terminal device. For example, when a service link distance L is less than a maximum service link distance $L_{max}$ and a coverage angle of a first network device corresponding to the terminal device is less than $\alpha_{max}$, the terminal device is within a coverage range of the first network device. For another example, when a service link distance is greater than a maximum distance, or a coverage angle of a first network device corresponding to the terminal device is greater than $\alpha_{max}$, the terminal device is outside the coverage range of the first network device. The terminal device may communicate with a second network device that replaces the first network device to serve the region. In other words, for the quasi-Earth fixed cell, if a position of the terminal device remains unchanged, the terminal device is always in a same sub-zone. However, a network device that serves the terminal device changes.

For the quasi-Earth moving cell, the coverage range of the NTN cell changes with movement of the network device. After cell division is performed on the NTN cell, the sub-zone in which the terminal device is located changes with movement of the network device. If the terminal device is fixed, the sub-zone in which the terminal device is located changes. The terminal device may determine, based on a message (for example, the foregoing first message) sent by the network device, the sub-zone in which the terminal device is located and a subsequent change status. If the terminal device is in a moving state, the terminal device needs to periodically receive a message from the network device, to determine sub-zones in which the terminal device is currently and subsequently located, to determine whether to trigger neighboring cell measurement and calculation and measurement that are related to neighboring cell measurement.

In some embodiments, the network device may provide the terminal device with an antenna beam angle at a cell center and a cell radius by using broadcast information/system information/dedicated signaling. A direction of a satellite sub-point and a service link distance may be determined based on the beam angle at the cell center. The network device may further provide the terminal device with NTN cell division. Sub-zones obtained through NTN cell division may be different based on a geographical position of the network device and different antenna azimuth angles. The terminal device may calculate coordinates of a reference position of the cell center based on the antenna azimuth angle and a moving speed of the network device. In addition, the terminal device further needs to calculate the edge of the cell based on the cell radius or a threshold.

In some embodiments, a time threshold T may be set when the network device moves. The network device may provide the terminal device with reference information each time the time T expires. The network device may provide the moving cell with an updated ephemeris parameter, or provide the moving cell with an ephemeris parameter having a timestamp. In addition, the network device may alternatively provide a moving cell with a plurality of reference positions and time information or the moving speed. When the terminal device may determine a time instant for arriving at the edge of the cell by the terminal device, the terminal device determines when to initiate cell measurement and cell handover.

Figure 8:
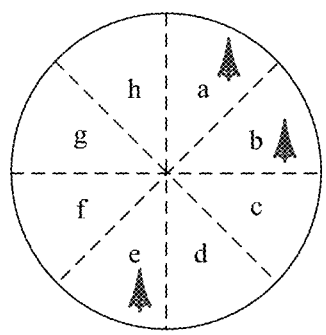
FIG. 8 is a schematic diagram of another division manner of an NTN cell according to an embodiment of the present application.
Figure 9:
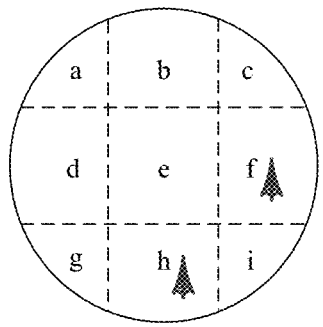
FIG. 9 is a schematic diagram of still another division manner of an NTN cell according to an embodiment of the present application.

As described above, cell division may be performed on the NTN cell in another manner. FIG. 8 and FIG. 9 show two possible division manners.

With reference to FIG. 8, an NTN cell is equally divided into eight sub-zones by using four intersecting diameters. The eight sub-zones are respectively a sub-zone a, a sub-zone b, a sub-zone c, a sub-zone d, a sub-zone e, a sub-zone f, a sub-zone g, and a sub-zone h. As shown in FIG. 8, a TN cell exists in each of the sub-zone a, the sub-zone b, and the sub-zone e.

With reference to FIG. 9, an NTN cell is divided into nine sub-zones in a grid manner. The nine sub-zones are respectively a sub-zone a, a sub-zone b, a sub-zone c, a sub-zone d, a sub-zone e, a sub-zone f, a sub-zone g, a sub-zone h, and a sub-zone i. As shown in FIG. 9, a TN cell exists in each of the sub-zone f and the sub-zone h.

If a TN unit exists in a sub-zone in FIG. 8 or FIG. 9, presence of the TN unit may be indicated by using specific indication information. For example, in the indication information, a bit corresponding to a sub-zone that includes a TN unit is set to 1; otherwise, a bit is set to 0. A region division rule and a numbering rule may be preconfigured for a terminal device. In this manner, a network device needs to provide the terminal device with only few bits, to indicate a position of a TN cell. In a possible implementation, the network device may notify the terminal device of the indication information by using a broadcast message or a system information block (system information block, SIB) message or a radio resource control (radio resource control, RRC) message. Upon receiving the indication information, the terminal device may calculate a rough area range of the TN cell based on a reference position and a radius of the NTN cell.

The foregoing describes the method embodiments of the present application in detail with reference to FIG. 4 to FIG. 9. The apparatus embodiments of the present application are described in detail below with reference to FIG. 10 to FIG. 12. It should be understood that the description of the apparatus embodiments corresponds to the description of the method embodiments. Therefore, for parts that are not described in detail, one may refer to the foregoing method embodiments.

Figure 10:
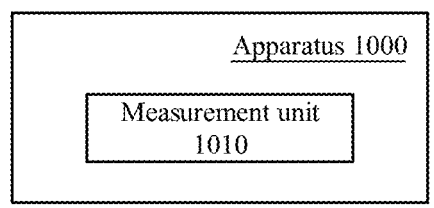
FIG. 10 is a schematic diagram of a structure of an apparatus for wireless communication according to an embodiment of the present application.

FIG. 10 is a schematic block diagram of an apparatus for wireless communication according to an embodiment of the present application. The apparatus 1000 may be any terminal device described above. The apparatus 1000 shown in FIG. 10 includes a measurement unit 1010.

The measurement unit 1010 may be configured to perform neighboring cell measurement in an NTN cell based on a first parameter. The first parameter is associated with one or more of the following information: a distance between the terminal device and a network device in the NTN cell; a height of a network device in the NTN cell from the ground; an azimuth angle of an antenna of a network device in the NTN cell; or a sub-zone in the NTN cell.

Optionally, the sub-zone in the NTN cell is determined based on a coverage angle of the network device in the NTN cell, and the coverage angle is less than or equal to the azimuth angle of the antenna.

Optionally, a projection of the network device in a direction perpendicular to the ground is located at a first position, the coverage angle corresponds to a boundary of the sub-zone, and the boundary of the sub-zone includes a curve centered on the first position.

Optionally, the NTN cell includes N sub-zones, N is a natural number greater than 1, and N coverage angles respectively corresponding to boundaries of the N sub-zones away from the first position meet the following condition:

$$0 < \alpha_i < \alpha_{i+1} \le \alpha_N.$$

In which, $\alpha_i$ is a coverage angle corresponding to a boundary, away from the first position, of an $i^{th}$ sub-zone in the N sub-zones, i is a natural number ranging from 1 to N−1, and $\alpha_N$ is the azimuth angle of the antenna.

Optionally, the NTN cell includes N sub-zones, N is a natural number greater than 1, and the N sub-zones are obtained by equally or unequally dividing a coverage region of the NTN cell.

Optionally, the sub-zone in the NTN cell is further determined based on one or more of the following information: coordinates of the network device in the NTN cell; a geographical environment of a coverage region of the NTN cell; distribution of a TN cell in a coverage region of the NTN cell; a limitation on signal interaction of the NTN cell; a measurement requirement and/or a handover requirement of the terminal device; or auxiliary information provided by the terminal device.

Optionally, the first parameter is determined based on a ratio of the distance between the terminal device and the network device in the NTN cell to the height.

Optionally, the apparatus 1000 further includes a determining unit that may be configured to: determine a second parameter based on the first parameter, where the second parameter is used to indicate a time instant for arriving at an edge of the NTN cell by the terminal device; and determine, based on the second parameter, whether to trigger neighboring cell measurement.

Optionally, the second parameter is further determined based on one or more of the following information: an azimuth angle of an antenna of the network device; and a sub-zone in the NTN cell.

Optionally, the second parameter is determined based on the azimuth angle of the antenna of the network device, and the time instant t for arriving at the edge of the NTN cell by the terminal device meets the following condition:

$$t = (\alpha_N - \alpha_i)/\Delta\gamma.$$

In which, an is the azimuth angle of the antenna of the network device, an is the coverage angle of the network device corresponding to a position of the terminal device, $\Delta\gamma$ is a relative angular velocity, $\Delta\gamma=\gamma_1-\gamma_2$, $\gamma_1$ is an angular velocity of the network device, and $\gamma_2$ is a rotational angular velocity of the Earth.

Optionally, the NTN cell includes N sub-zones, where N is a natural number greater than 1. The apparatus 1000 further includes a setting unit, setting a time measurement threshold. The time measurement threshold corresponds to a sub-zone in the N sub-zones that includes an edge of the NTN cell. The measurement unit 1010 may be further configured to perform neighboring cell measurement at a start time instant of the time measurement threshold.

Optionally, boundaries of the N sub-zones are centered on the first position of the network device, the projection of the network device in the direction perpendicular to the ground is located at the first position, the terminal device is located in an $i^{th}$ sub-zone in the N sub-zones, i is a natural number ranging from 1 to N−1, and the time t instant for arriving at the edge of the NTN cell by the terminal device meets the following condition:

$$t = (\alpha_N - \alpha_i)/\Delta\gamma.$$

In which, an is the azimuth angle of the antenna of the network device, $\alpha_i$ is a coverage angle that is of the network device and that corresponds to a boundary, away from the first position, of the i$^{th}$ sub-zone, $\Delta\gamma$ is a relative angular velocity, $\Delta\gamma=\gamma_1-\gamma_2$, $\gamma_1$ is an angular velocity of the network device, and $\gamma_2$ is a rotational angular velocity of the Earth.

Optionally, the determining unit is further configured to: determine a second parameter based on the first parameter, where the second parameter is used to indicate the coverage angle of the network device corresponding to the terminal device; and determine, based on the second parameter, whether to trigger neighboring cell measurement.

Optionally, the NTN cell includes N sub-zones, where N is a natural number greater than 1. The azimuth angle of the antenna of the network device is used for determining N angular regions in a one-to-one correspondence with the N sub-zones of the NTN cell. The measurement unit 1010 is further configured to trigger the neighboring cell measurement if the coverage angle of the network device corresponding to the terminal device is included in an angular region including the azimuth angle of the antenna.

Optionally, the determining unit is further configured to: determine a second parameter based on the first parameter, where the second parameter is used to indicate a distance between the terminal device and an edge of the NTN cell; and determine, based on the second parameter, whether to trigger neighboring cell measurement.

Optionally, the second parameter is further determined based on one or more of the following information: an offset determined based on a reference position by the network device in the NTN cell; ephemeris data of the network device in the NTN cell; a moving speed of the network device in the NTN cell; a motion trajectory of the network device in the NTN cell; or movement information of the terminal device.

Optionally, the first parameter is used for determining a time instant for arriving at the edge of the NTN cell by the terminal device, and the second parameter is determined based on the movement information of the terminal device and the time instant for arriving at the edge of the NTN cell.

Optionally, the NTN cell is a quasi-Earth moving cell, the second parameter is related to the offset determined based on the reference position by the network device in the NTN cell, the reference position is a first projection position of the network device at a first time point, the offset is a distance between the first projection position and a second projection position of the network device at a second time point, and the offset is used for determining a distance between the terminal device and the network device at the second time point.

Optionally, the distance between the terminal device and the network device at the second time point is further determined based on position information of the terminal device.

Optionally, the motion trajectory of the network device is related to the first projection position and the second projection position, and the distance $d_2$ between the terminal device and the network device at the second time point meets the following condition:

$$d_2 = d_1\sin\theta_1/\sin\theta_2.$$

In which, $d_1$ represents a distance between the terminal device and the network device at the first time point, $d_2$ represents the distance between the terminal device and the network device at the second time point, $\theta_1$ represents an included angle between the motion trajectory and a line between the terminal device and the reference position, and $\theta_2$ represents an included angle between the motion trajectory and a line between the terminal device and the second projection position.

Optionally, the included angle $\theta_2$ meets the following condition:

$$\theta_2 = 180 - \arctg[d_1\sin\theta_1/(L_{offset} - d_1\cos\theta_1)].$$

In which, $L_{offset}$ represents the offset determined by the network device based on the reference position at the second time point.

Optionally, the first parameter is used for determining a sub-zone in which the terminal device is located, and the determining unit is further configured to determine, based on the sub-zone in which the terminal device is located, whether to trigger the neighboring cell measurement.

Optionally, the determining unit is further configured to determine, based on the first parameter and a relaxation measurement region, whether to trigger the neighboring cell measurement, where the relaxation measurement region is used for determining a parameter range for triggering the neighboring cell measurement, and the first parameter is used for determining a parameter value that is of the terminal device and that is included the parameter range.

Figure 11:
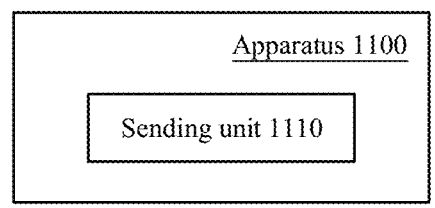
FIG. 11 is a schematic diagram of a structure of another apparatus for wireless communication according to an embodiment of the present application.

FIG. 11 is a schematic block diagram of an apparatus for wireless communication according to another embodiment of the present application. The apparatus 1100 may be any network device described above. The apparatus 1100 shown in FIG. 11 includes a sending unit 1110.

The sending unit 1110 may be configured to send a first parameter to a terminal device, where the first parameter is used by the terminal device to perform neighboring cell measurement in an NTN cell, and the first parameter is associated with one or more of the following information: a distance between the terminal device and a network device; a height of a network device from the ground; an azimuth angle of an antenna of a network device; or a sub-zone in the NTN cell.

Optionally, the sub-zone in the NTN cell is determined based on a coverage angle of the network device, and the coverage angle is less than or equal to the azimuth angle of the antenna.

Optionally, a projection of the network device in a direction perpendicular to the ground is located at a first position, the coverage angle corresponds to a boundary of the sub-zone, and the boundary of the sub-zone includes a curve centered on the first position.

Optionally, the NTN cell includes N sub-zones, N is a natural number greater than 1, and N coverage angles respectively corresponding to boundaries of the N sub-zones away from the first position meet the following condition:

$$0 < \alpha_i < \alpha_{i+1} \leq \alpha_N.$$

In which, $α_i$ is a coverage angle corresponding to a boundary, away from the first position, of an $i^{th}$ sub-zone in the N sub-zones, i is a natural number ranging from 1 to N−1, and ax is the azimuth angle of the antenna.

Optionally, the NTN cell includes N sub-zones, N is a natural number greater than 1, and the N sub-zones are obtained by equally or unequally dividing a coverage region of the NTN cell.

Optionally, the sub-zone in the NTN cell is further determined based on one or more of the following information: coordinates of the network device; a geographical environment of a coverage region of the NTN cell; distribution of a territorial network TN cell in a coverage region of the NTN cell; a limitation on signal interaction of the NTN cell; a measurement requirement and/or a handover requirement of the terminal device; or auxiliary information provided by the terminal device.

Optionally, the first parameter is determined based on a ratio of the distance between the terminal device and the network device to the height.

Optionally, the sending unit 1110 is further configured to: send first information to the terminal device, where the first information is used by the terminal device to determine whether to trigger the neighboring cell measurement; and the first information includes one or more of the following information: an offset determined based on a reference position by the network device; ephemeris data of the network device; a moving speed of the network device; or a motion trajectory of the network device.

Optionally, the first parameter and the first information are carried in one or more of the following information: broadcast information, system information, or dedicated signalling.

Figure 12:
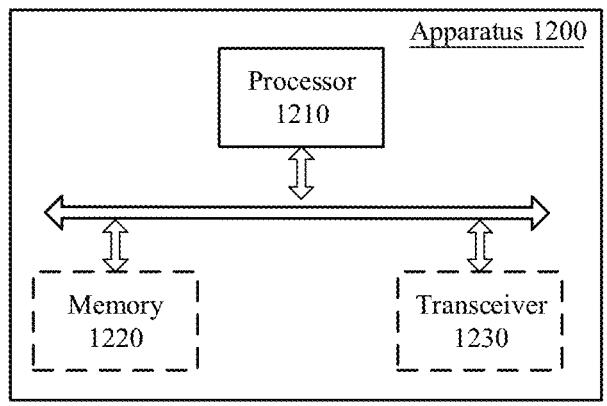
FIG. 12 is a schematic diagram of a structure of a communications apparatus according to an embodiment of the present application.

FIG. 12 is a schematic diagram of a structure of a communications apparatus according to an embodiment of the present application. Dashed lines in FIG. 12 indicate that units or modules are optional. The apparatus 1200 may be configured to implement the methods described in the foregoing method embodiments. The apparatus 1200 may be a chip, a terminal device, or a network device.

The apparatus 1200 may include one or more processors 1210. The processor 1210 may support the apparatus 1200 in implementing the methods described in the foregoing method embodiments. The processor 1210 may be a general-purpose processor or a dedicated processor. For example, the processor may be a central processing unit (central processing unit, CPU). Alternatively, the processor may be another general-purpose processor, a digital signal processor (digital signal processor, DSP), an application-specific integrated circuit (application-specific integrated circuit, ASIC), a field-programmable gate array (field-programmable gate array, FPGA) or another programmable logic device, a discrete gate or transistor logic device, a discrete hardware component, or the like. A general-purpose processor may be a microprocessor, or the processor may also be any conventional processor or the like.

The apparatus 1200 may further include one or more memories 1220. The memory 1220 stores a program. The program may be executed by the processor 1210, so that the processor 1210 performs the methods described in the foregoing method embodiments. The memory 1220 may be independent of the processor 1210 or may be integrated into the processor 1210.

The apparatus 1200 may further include a transceiver 1230. The processor 1210 may communicate with another device or chip through the transceiver 1230. For example, the processor 1210 may send data to another device and receive data from another device or chip through the transceiver 1230.

An embodiment of the present application further provides a computer-readable storage medium for storing a program. The computer-readable storage medium may be applied to the terminal or the network device provided in embodiments of the present application, and the program causes a computer to perform the methods performed by the terminal or the network device in various embodiments of the present application.

In some embodiments, the computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive (solid state disk, SSD)), or the like.

An embodiment of the present application further provides a computer program product. The computer program product includes a program. The computer program product may be applied to the terminal or the network device provided in embodiments of the present application, and the program causes a computer to perform the methods performed by the terminal or the network device in various embodiments of the present application.

All or some of the foregoing embodiments may be implemented by software, hardware, firmware, or any combination thereof. When the software is used to implement embodiments, all or some of embodiments may be implemented in a form of a computer program product. The computer program product includes one or more computer instructions. When the computer program instructions are loaded and executed on the computer, all or some procedures or functions in embodiments of the present application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (for example, a coaxial cable, an optical fiber, and a digital subscriber line (digital subscriber line, DSL)) manner or a wireless (for example, infrared, wireless, and microwave) manner.

An embodiment of the present application further provides a computer program. The computer program may be applied to the terminal or the network device provided in embodiments of the present application, and the computer program causes a computer to perform the methods performed by the terminal or the network device in various embodiments of the present application.

The terms "system" and "network" in the present application may be used interchangeably. In addition, the terms used in the present application are merely used to explain the specific embodiments of the present application, and are not intended to limit the present application. In the specification, claims, and accompanying drawings of the present application, the terms "first", "second", "third", "fourth", and the like are intended to distinguish between different objects but do not indicate a particular order. In addition, the terms "include" and "have" and any other variants thereof are intended to cover a non-exclusive inclusion.

In embodiments of the present application, "indicate" mentioned herein may indicate a direct indication, or may indicate an indirect indication, or may indicate that there is an association relationship. For example, if A indicates B, it may mean that A directly indicates B, for example, B can be obtained from A. Alternatively, it may mean that A indirectly indicates B, for example, A indicates C, and B can be obtained from C. Alternatively, it may mean that there is an association relationship between A and B.

In embodiments of the present application, the term "correspond" may indicate that there is a direct or indirect correspondence between the two, or may indicate that there is an association relationship between the two, which may also be a relationship such as indicating and being indicated, or configuring and being configured.

In embodiments of the present application, the "protocol" may indicate a standard protocol in the communication field, and may include, for example, an LTE protocol, an NR protocol, and a related protocol applied to a future communication system. This is not limited in the present application.

In embodiments of the present application, determining B based on A does not mean determining B based on only A, but instead B may be determined based on A and/or other information.

In embodiments of the present application, the term "and/or" is merely an association relationship that describes associated objects, and represents that there may be three relationships. For example, A and/or B may represent three cases: only A exists, both A and B exist, and only B exists. In addition, the character "/" in this specification usually indicates an "or" relationship between the associated objects.

In several embodiments provided in the present application, it should be understood that, the disclosed system, apparatus, and method may be implemented in other manners. For example, the foregoing described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between apparatuses or units may be implemented in electrical, mechanical, or other forms.

The units described as separate parts may or may not be physically separate, and parts displayed as units may or may not be physical units, and may be located at one position, or may be distributed on a plurality of network elements. Some or all of the units may be selected according to actual requirements to achieve the objectives of the solutions of embodiments.

In addition, functional units in embodiments of the present application may be integrated into one processing unit, each of the units may exist alone physically, or two or more units are integrated into one unit.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for wireless communication, comprising:
   determining, by a terminal device, a second parameter based on a first parameter, wherein the second parameter indicates a distance between the terminal device and an edge of a non-terrestrial network (NTN) cell;
   determining, by the terminal device based on the second parameter, whether to trigger a neighboring cell measurement; and
   performing, by terminal device, the neighboring cell measurement in the NTN cell based on the first parameter, wherein the first parameter is associated with one or more of following information:
   a distance between the terminal device and a network device in the NTN cell;
   a height of a network device in the NTN cell from ground;
   an azimuth angle of an antenna of a network device in the NTN cell;
   a sub-zone in the NTN cell, or
   a distance between an edge of the NTN cell and the network device.

2. The method according to claim 1, wherein the sub-zone in the NTN cell is determined based on a coverage angle of the network device in the NTN cell, and the coverage angle is less than or equal to the azimuth angle of the antenna.

3. The method according to claim 2, wherein a projection of the network device in a direction perpendicular to the ground is located at a first position, the coverage angle corresponds to a boundary of the sub-zone, and the boundary of the sub-zone comprises a curve centered on the first position.

4. The method according to claim 3, wherein the NTN cell comprises N sub-zones, N is a natural number greater than 1, and N coverage angles respectively corresponding to boundaries of the N sub-zones away from the first position meet a following condition:
   $0<\alpha_i<\alpha_{i+1}<\alpha_N$, wherein
   $\alpha_i$ is a coverage angle corresponding to a boundary, away from the first position, of an $i^{th}$ sub-zone in the N sub-zones, i is a natural number ranging from 1 to N−1, and an is the azimuth angle of the antenna.

5. The method according to claim 2, wherein the NTN cell comprises N sub-zones, N is a natural number greater than 1, and the N sub-zones divides a coverage region of the NTN cell.

6. The method according to claim 2, wherein the sub-zone in the NTN cell is further determined based on one or more of following information:
   coordinates of the network device in the NTN cell;
   a geographical environment of a coverage region of the NTN cell;
   distribution of a territorial network TN cell in a coverage region of the NTN cell;
   a limitation on signal interaction of the NTN cell;
   a measurement requirement and/or a handover requirement of the terminal device; or
   auxiliary information provided by the terminal device.

7. The method according to claim 1, wherein the first parameter is determined based on a ratio of the distance between the terminal device and the network device in the NTN cell to the height.

8. The method according to claim 7, wherein the second parameter indicates a time instant for arriving at an edge of the NTN cell by the terminal device.

9. The method according to claim 8, wherein the second parameter is further determined based on one or more of following information:
the azimuth angle of the antenna of the network device; or
the sub-zone in the NTN cell.

10. The method according to claim 9, wherein the second parameter is determined based on the azimuth angle of the antenna of the network device, and the time instant t for arriving at the edge of the NTN cell by the terminal device meets a following condition:
$t=(\alpha_N-\alpha_n)/\Delta\gamma$, wherein
$\alpha_N$ is the azimuth angle of the antenna of the network device, an is a coverage angle of the network device corresponding to a $n^{th}$ position of the terminal device, n is a natural number ranging from 1 to N−1, $\Delta\gamma$ is a relative angular velocity, $\Delta\gamma=\gamma_1-\gamma_2$, $\gamma_1$ is an angular velocity of the network device, and $\gamma_2$ is a rotational angular velocity of the Earth.

11. The method according to claim 9, wherein the NTN cell comprises N sub-zones, N is a natural number greater than 1, and the determining, by the terminal device based on the second parameter, whether to trigger the neighboring cell measurement comprises:
setting, by the terminal device, a time measurement threshold, wherein the time measurement threshold corresponds to a sub-zone in the N sub-zones that comprises the edge of the NTN cell; and
performing, by the terminal device, the neighboring cell measurement at a start time instant of the time measurement threshold.

12. The method according to claim 11, wherein boundaries of the N sub-zones are centered on a first position of the network device, a projection of the network device in a direction perpendicular to the ground is located at the first position, the terminal device is located in an $i^{th}$ sub-zone in the N sub-zones, i is a natural number ranging from 1 to N−1, and the time instant t for arriving at the edge of the NTN cell by the terminal device meets a following condition:
$t=(\alpha_N-\alpha_i)/\Delta\gamma$, wherein
$\alpha_N$ is the azimuth angle of the antenna of the network device, $\alpha_i$ is a coverage angle of the network device and that corresponds to a boundary, away from the first position, of the $i^{th}$ sub-zone, $\Delta\gamma$ is a relative angular velocity, $\Delta\gamma=\gamma_1-\gamma_2$, $\gamma_1$ is an angular velocity of the network device, and $\gamma_2$ is a rotational angular velocity of the Earth.

13. The method according to claim 7, wherein the second parameter indicates a coverage angle of the network device corresponding to the terminal device.

14. The method according to claim 13, wherein the NTN cell comprises N sub-zones, N is a natural number greater than 1, the azimuth angle of the antenna of the network device is used for determining N angular regions in a one-to-one correspondence with the N sub-zones of the NTN cell, and wherein the determining, by the terminal device based on the second parameter, whether to trigger the neighboring cell measurement comprises:
triggering, by the terminal device, the neighboring cell measurement when the coverage angle of the network device corresponding to the terminal device is comprised in an angular region comprising the azimuth angle of the antenna.

15. The method according to claim 1, wherein the second parameter is further determined based on one or more of following information:
an offset determined based on a reference position by the network device in the NTN cell;
ephemeris data of the network device in the NTN cell;
a moving speed of the network device in the NTN cell;
a motion trajectory of the network device in the NTN cell; or
movement information of the terminal device.

16. The method according to claim 1, wherein the first parameter is used for determining a time instant for arriving at the edge of the NTN cell by the terminal device, and the second parameter is determined based on the movement information of the terminal device and the time instant for arriving at the edge of the NTN cell.

17. An apparatus, comprising:
at least one processor;
one or more non-transitory computer-readable storage media coupled to the at least one processor and storing programming instructions for execution by the at least one processor, wherein the programming instructions, when executed, cause the apparatus to perform operations comprising:
determining a second parameter based on a first parameter, wherein the second parameter indicates a distance between a terminal device and an edge of a non-terrestrial network (NTN) cell;
determining, based on the second parameter, whether to trigger a neighboring cell measurement; and
performing the neighboring cell measurement in the NTN cell based on the first parameter, wherein the first parameter is associated with one or more of following information:
a distance between s terminal device and a network device in the NTN cell;
a height of a network device in the NTN cell from ground;
an azimuth angle of an antenna of a network device in the NTN cell;
a sub-zone in the NTN cell, or
a distance between an edge of the NTN cell and the network device.

18. The apparatus according to claim 17, wherein the second parameter is further Page determined based on one or more of following information:
an offset determined based on a reference position by the network device in the NTN cell;
ephemeris data of the network device in the NTN cell;
a moving speed of the network device in the NTN cell;
a motion trajectory of the network device in the NTN cell; or
movement information of the terminal device.

19. The apparatus according to claim 17, wherein the first parameter is determined based on a ratio of the distance between the terminal device and the network device in the NTN cell to the height.

20. One or more non-transitory computer-readable media storing computer instructions, that when executed by one or more processors, cause a computing device to perform operations comprising:
determining a second parameter based on a first parameter, wherein the second parameter indicates a distance between a terminal device and an edge of a non-terrestrial network (NTN) cell;
determining, based on the second parameter, whether to trigger a neighboring cell measurement; and performing the neighboring cell measurement in the NTN cell based on the first parameter, wherein the first parameter is associated with one or more of following information:
a distance between s terminal device and a network device in the NTN cell;
a height of a network device in the NTN cell from ground;
an azimuth angle of an antenna of a network device in the NTN cell;
a sub-zone in the NTN cell, or
a distance between an edge of the NTN cell and the network device.

* * * * *